United States Patent [19]

Nepper

[11] 4,420,105
[45] Dec. 13, 1983

[54] FLEXIBLE HINGE AND CLOSURE MEMBER FOR A LUGGAGE CARRIER

[76] Inventor: John P. Nepper, 9826 Hartman, Omaha, Nebr. 68134

[21] Appl. No.: 431,712

[22] Filed: Sep. 30, 1982

[51] Int. Cl.³ .............................................. B60R 9/04
[52] U.S. Cl. .................................. 224/328; 220/337; 220/343
[58] Field of Search ................ 224/328; 220/334, 337, 220/339, 342, 343

[56] References Cited

U.S. PATENT DOCUMENTS

| | | | |
|---|---|---|---|
| 1,153,644 | 9/1915 | Rilling . | |
| 1,198,524 | 9/1916 | Cundiffe | 220/343 |
| 1,244,239 | 10/1917 | Parker et al. | 220/343 |
| 1,665,358 | 4/1928 | Hall et al. | 224/316 |
| 2,134,635 | 10/1938 | Boeuf | 224/326 |
| 2,914,231 | 11/1959 | Hornke | 224/316 |
| 2,920,802 | 1/1960 | Cook | 224/328 |
| 3,006,515 | 11/1961 | Doane | 224/316 |
| 3,152,716 | 10/1964 | Feldhahn | 220/4 E |
| 3,513,491 | 5/1970 | Gordon . | |
| 3,514,023 | 5/1970 | Russell et al. | 224/316 |
| 3,624,848 | 12/1971 | Nissen . | |
| 3,907,184 | 9/1975 | Zane | 224/328 |
| 3,951,362 | 10/1975 | Hart | 224/328 |
| 4,225,069 | 9/1980 | Breitschwerdt | 224/328 |
| 4,261,496 | 4/1981 | Mareydt | 224/315 |

*Primary Examiner*—Steven M. Pollard
*Attorney, Agent, or Firm*—Zarley, McKee, Thomte, Voorhees & Sease

[57] ABSTRACT

A flexible hinge and closure member for a luggage carrier is described wherein the carrier comprises a lower portion including a bottom, front and back walls, and opposite side walls. The upper portion is removably mounted on the lower portion and includes a top, front and back walls, and opposite side walls. An elongated flexible member detachably hingedly secures the lower end of the side walls of the upper portion to the upper end the side walls of the lower portion. When it is desired to open the luggage carrier, one of the flexible members is removed to permit the upper portion to be pivotally moved upwardly with respect to the lower portion about the other flexible member.

8 Claims, 9 Drawing Figures

FLEXIBLE HINGE AND CLOSURE MEMBER FOR A LUGGAGE CARRIER

BACKGROUND OF THE INVENTION

This invention relates to a luggage carrier and more particularly to a flexible hinge and closure member for use on a luggage carrier.

A large majority of luggage carriers such as roof-top carriers and small trailers include metal hinges or connecting rods which serve not only as hinges but also as closure members. If the metal rods become dislodged during use, the rods become dangerous road debris.

A further disadvantage in the conventional hinges for luggage carriers is that the hinges between the bottom and upper portions of the carrier must be substantially straight to enable the rods to be extended therethrough. The requirement that the hinges be straight dictates that the configuration of the carrier be generally box-like or aerodynamically inefficient.

Therefore, it is a principal object of the invention to provide a flexible hinge and closure member for a luggage carrier.

Still another object of the invention is to provide a luggage carrier including flexible lacing cables which secure the lower ends of the side walls of the cover of the carrier to the lower portion of the carrier.

Still another object of the invention is to provide a luggage carrier for a vehicle which is durable in use and refined in appearance.

These and other objects will be apparent to those skilled in the art.

SUMMARY OF THE INVENTION

Figure 1:
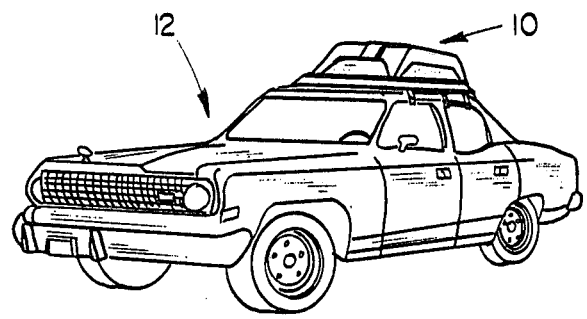
FIG. 1 is a front perspective view of the luggage carrier of this invention mounted on a vehicle.
Figure 2:
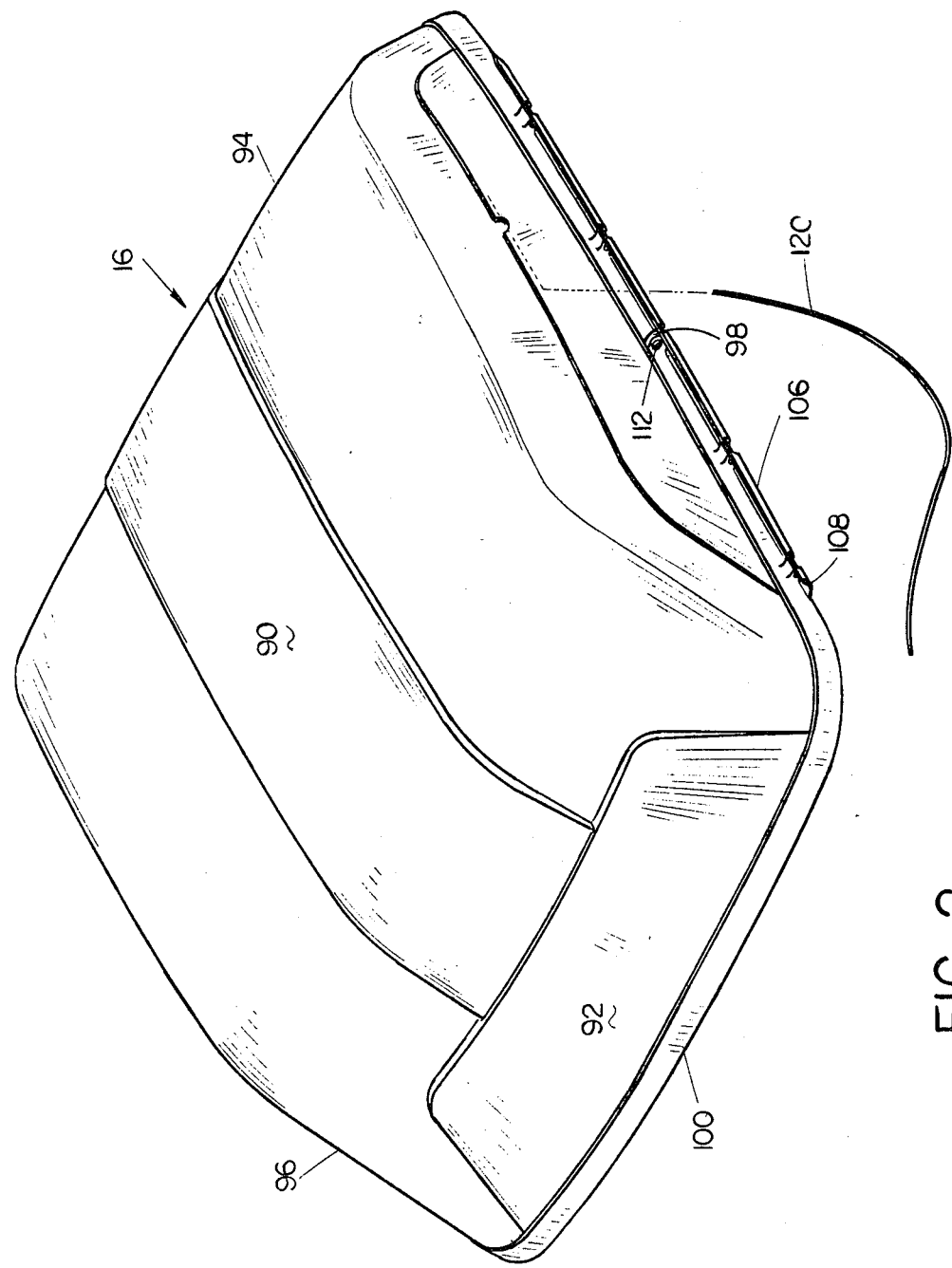
FIG. 2 is a front perspective view of the cover or upper portion of the luggage carrier.
Figure 3:
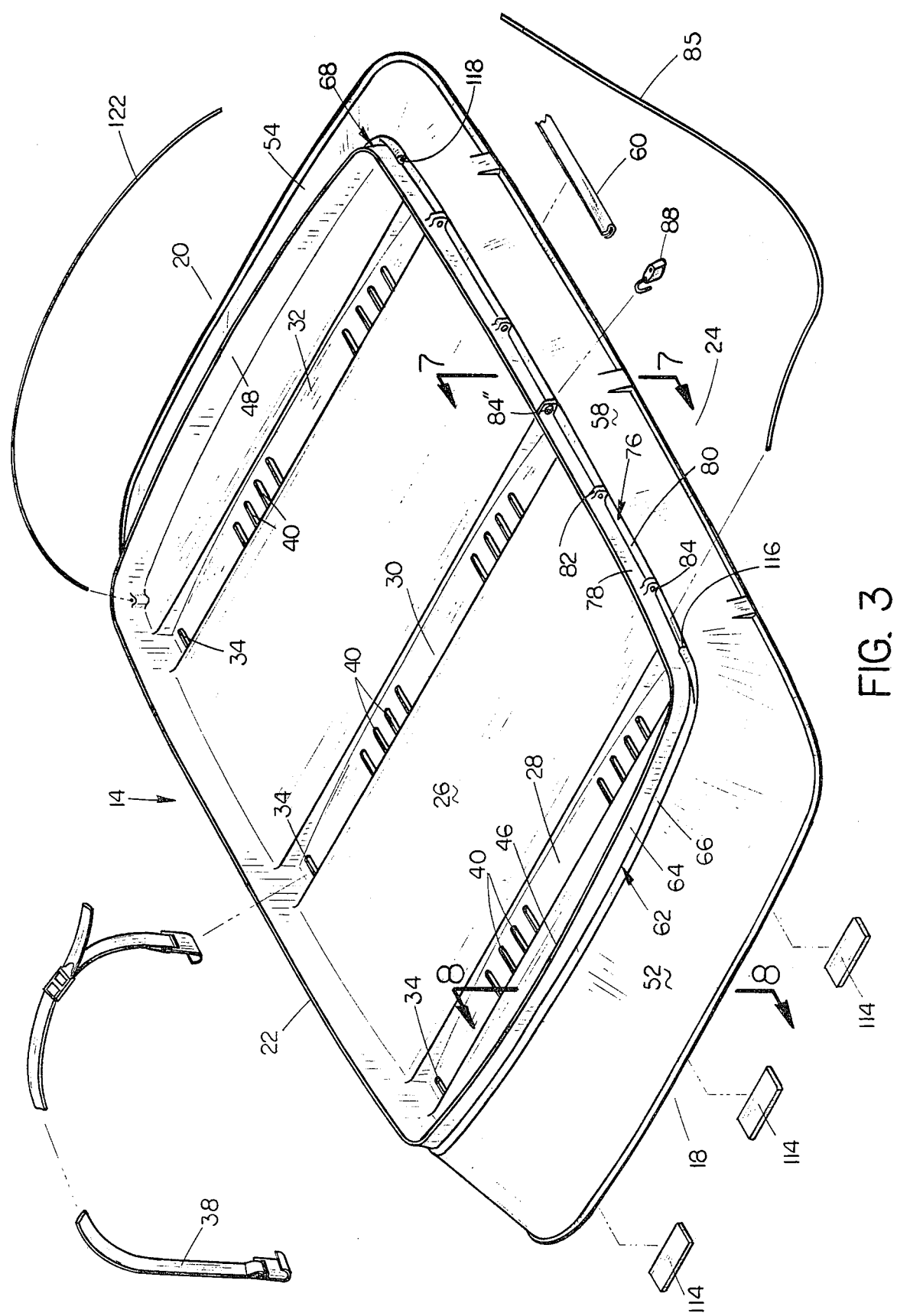
FIG. 3 is a perspective view of the lower portion of the luggage carrier of this invention.
Figure 4:
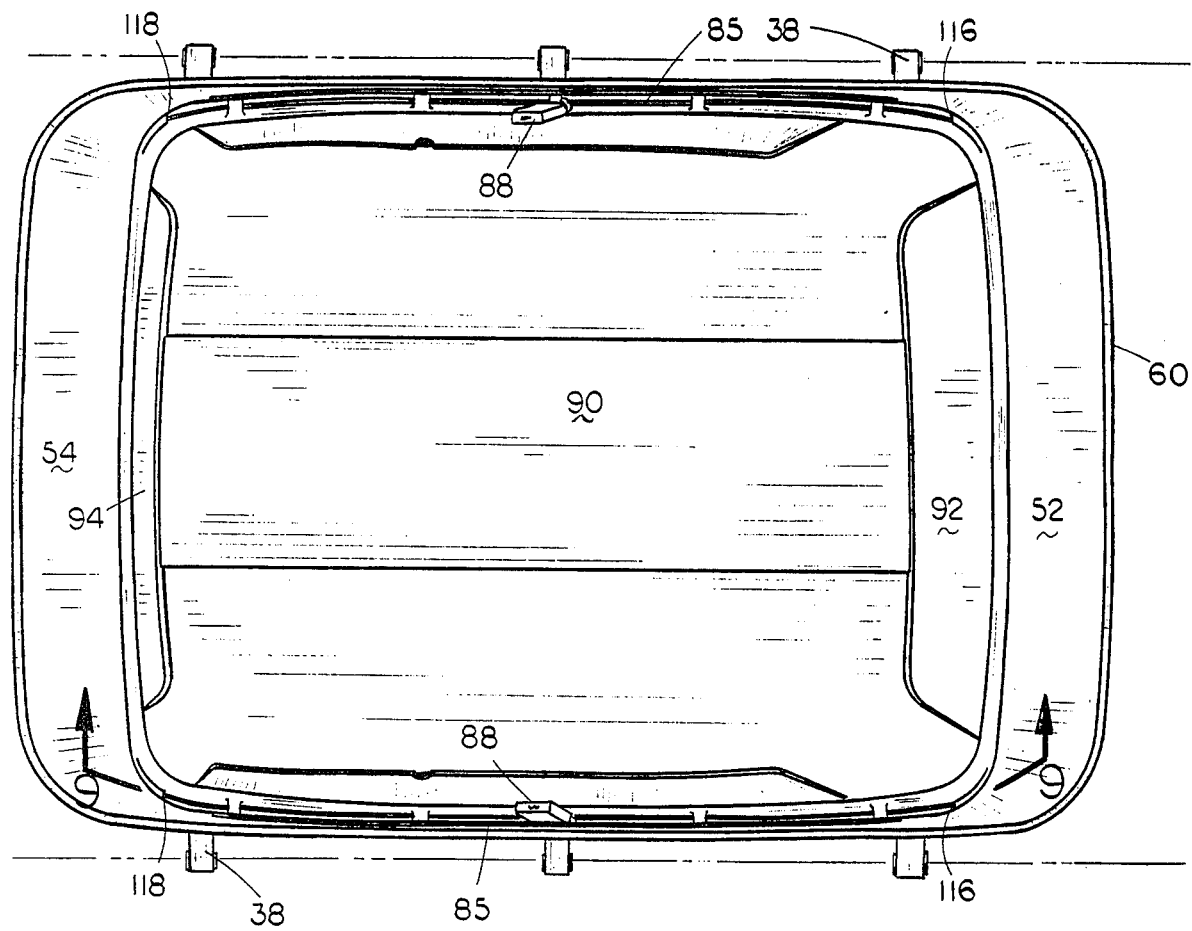
FIG. 4 is a top view of the luggage carrier.

A luggage carrier is described comprising a lower portion having an upper portion removably mounted thereon. The lower portion of the carrier comprises a bottom wall, front and back walls, and opposite side walls. Each of the front, back and opposite side walls of the lower portion include an inner wall portion which extends upwardly from the bottom and an outer wall portion which extends downwardly and outwardly from the upper end of the inner wall portion. The outer wall portions of each of the side walls are provided with shoulders or ledges having a plurality of spaced-apart protrusions formed therein. The lower ends of the side walls of the upper portion are provided with spaced-apart channel members which receive the protrusions when the upper portion is mounted on the lower portion. A lacing cable extends through the protrusions and channel members to secure the upper portion to the lower portion.

DESCRIPTION OF THE PREFERRED EMBODIMENT

The storage container of this invention is referred to generally by the reference numeral 10 and is designed to be secured to the roof of a vehicle such as a car 12, van or the like. For purposes of description, container 10 will be described as comprising a bottom or lower portion 14 and a top or upper portion 16. For purposes of description, lower portion 14 will be described as having a forward end 18, rearward end 20, and opposite sides 22 and 24.

Bottom portion 14 includes a bottom wall 26 having three channels 28, 30 and 32 formed therein which extend transversely thereacross. Each of the channels 28, 30 and 32 are provided with strap openings 34 and 36 at the opposite ends thereof to permit the cargo or tie-down straps 38 to extend outwardly therethrough. The cargo straps rest in the channels and are laced or woven through the slits 40 formed in channels 28, 30 and 32. The ends of the straps 38 are secured to the rain gutters of the vehicle in conventional fashion.

Bottom portion 14 includes inner side walls 42 and 44 which extend upwardly from the sides of bottom 26. As seen in the drawings, bottom portion 14 is also provided with inner forward and rearward walls 46 and 48 which extend upwardly from the forward and rearward ends of bottom 26. Bottom portion 14 also includes a skirt portion referred to generally by the reference numeral 50 which extends downwardly and outwardly from the upper ends of the inner walls 42, 44, 46 and 48 for engagement with the roof of the vehicle. For purposes of description, skirt portion 50 will be described as comprising a front skirt portion 52, rear skirt portion 54, and side skirt portions 56 and 58. The lower ends of the skirt portions 52, 54, 56 and 58 extend outwardly as illustrated in the drawings to define a lip or shoulder 59 which preferably has a suitable rubber or resilient cushion member 60 positioned thereon.

As seen in the drawings, skirt portion 52 is provided with a shoulder 62 defined by a vertical wall portion 64 and a horizontal wall portion 66. Likewise, skirt portion 54 is provided with a shoulder 68. Skirt portion 56 is provided with a shoulder 70 defined by an inclined wall 72 and a substantially horizontal wall 74. Similarly, skirt portion 58 is provided with a shoulder 76 defined by inclined wall 78 and a substantially horizontal wall 80. A plurality of horizontally spaced protrusions 82 are formed in the shoulder 76 and have openings 84 formed therein to permit a flexible lacing cable 85 to be extended therethrough as will be described in more detail hereinafter. Shoulder 70 is also provided with a plurality of the spaced protrusions 82 formed therein which are adapted to receive flexible lacing cable 85. The centermost protrusion 82 in each of the shoulders 76 and 70 has a height greater than the remaining protrusions and has an enlarged opening 84" formed therein adapted to receive the shackle of a lock 88 as will be described in more detail hereinafter.

Figure 5:
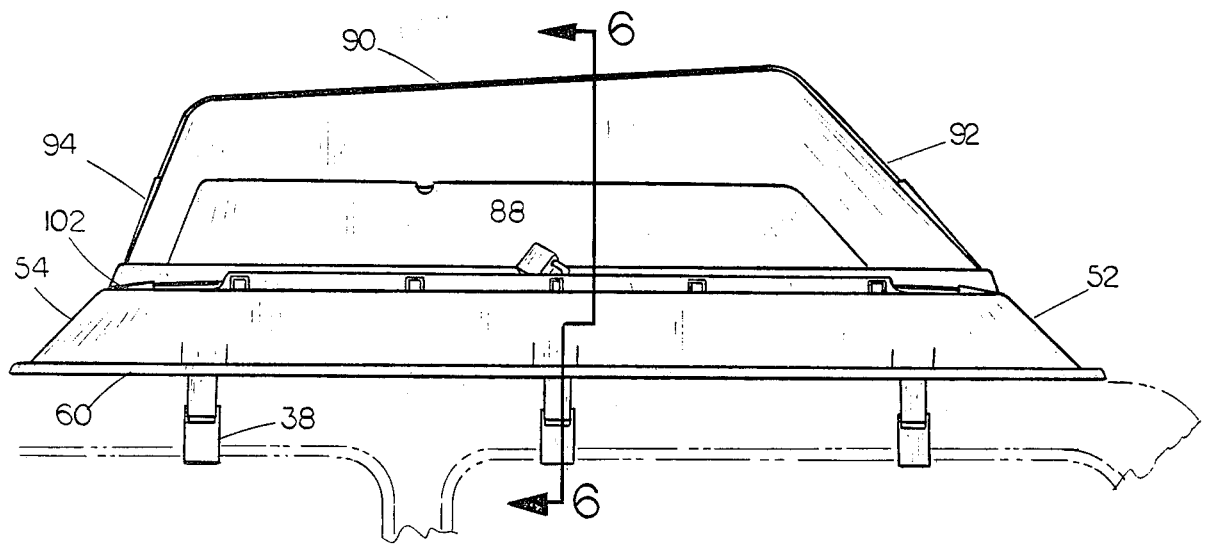
FIG. 5 is a side view of the luggage carrier with the broken lines indicating a vehicle.

Top portion 16 generally comprises top 90, forward wall 92, back wall 94 and side walls 96 and 98. As seen in FIG. 5, front wall 92 extends downwardly and forwardly from the forward edge of top 16 and is generally parallel to front skirt portion 52. Likewise, back wall 94 extends downwardly and rearwardly from the rearward end of top 90 and is generally parallel to the rear skirt portion 54. The lower forward end of front wall 92 is provided with a lower end portion 100 which is adapted to be received by the shoulder 62. Likewise, the lower rearward end of wall 94 is provided with a lower end portion 102 which is adapted to be received by the shoulder 68. The lower ends of sides 96 and 98 are provided with lower end portions 104 and 106 respectively which are adapted to be received by the shoulders 70 and 76 respectively. Each of the lower end portions of the walls 96 and 98 are provided with a channel-like portion 108 having a plurality of substantially inverted U-shaped channel members 110 which are adapted to receive the protrusions 82. As seen in the drawings, each of the channel members 110 are provided with openings 112 formed therein which are adapted to register with the openings 84 in the protrusions 82. The centermost protrusion 110 includes an enlarged opening 112″ which is adapted to register with the opening 84″ so as to receive the shackle of the lock 88.

In use, the lower portion 14 would be positioned on the roof with the pads 114 being positioned beneath channels 28 and the roof of the vehicle to provide cushioning therebetween. The lower end portions of the outer side walls of the skirts are slightly bowed and will conform to the roof of the vehicle when the straps 38 are secured to the rain gutter of the vehicle and tightened. The fact that the straps 38 are positioned in the channels 28 and are laced through the openings 40, prevent lateral movement of the carrier with respect to the vehicle during use of the carrier.

If upper portion 16 had not previously been placed on lower portion 14, upper portion 16 would be positioned thereupon at this time. The lower ends of the front wall 92, back wall 94, and opposite side walls 96 and 98 of upper portion 16 are received by the shoulders 62, 68, 70 and 76 respectively and the close-fitting relationship therebetween prevents water from entering the interior of the carrier.

Figure 6:
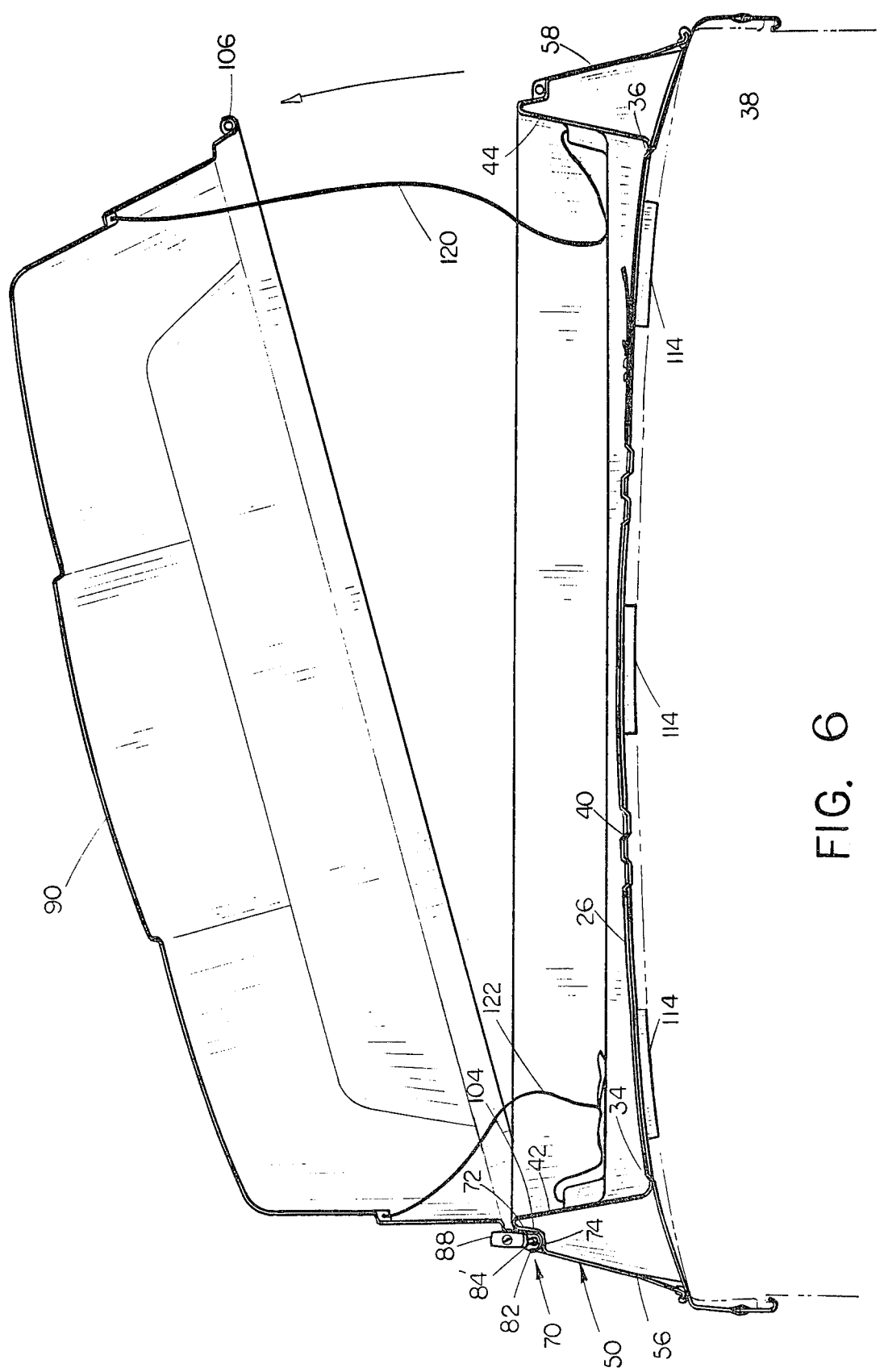
FIG. 6 is an enlarged sectional view seen on line 6—6 of FIG. 5.
Figure 8:
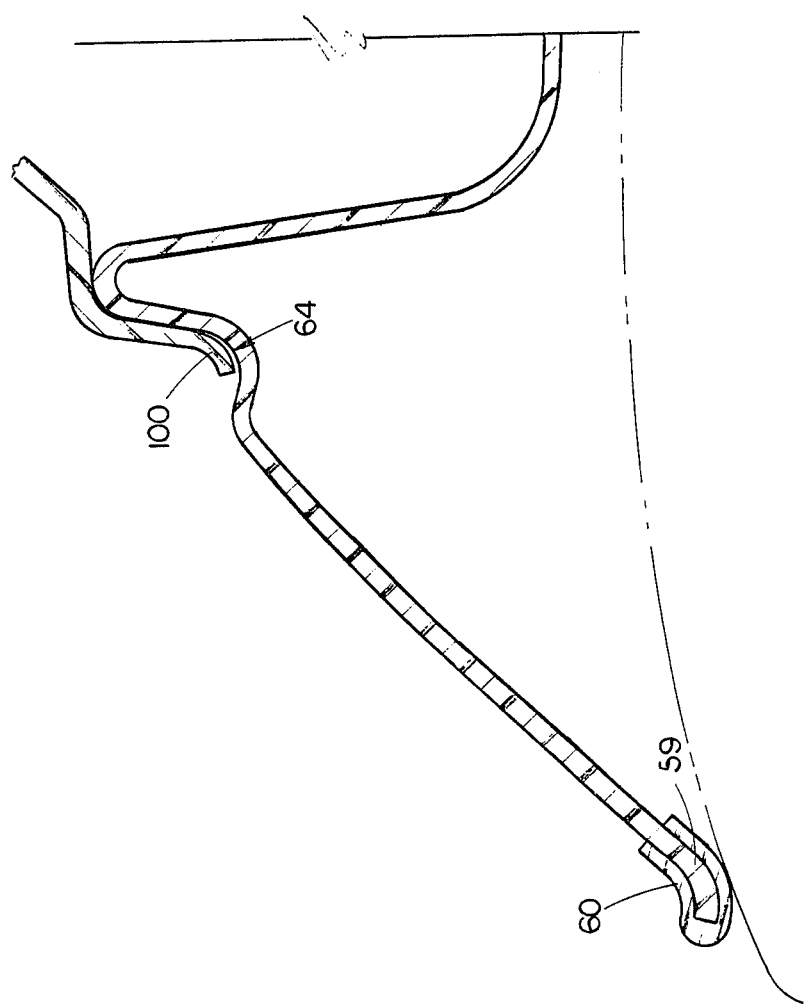
FIG. 8 is an enlarged sectional view seen on line 8—8 of FIG. 4.
Figure 7:
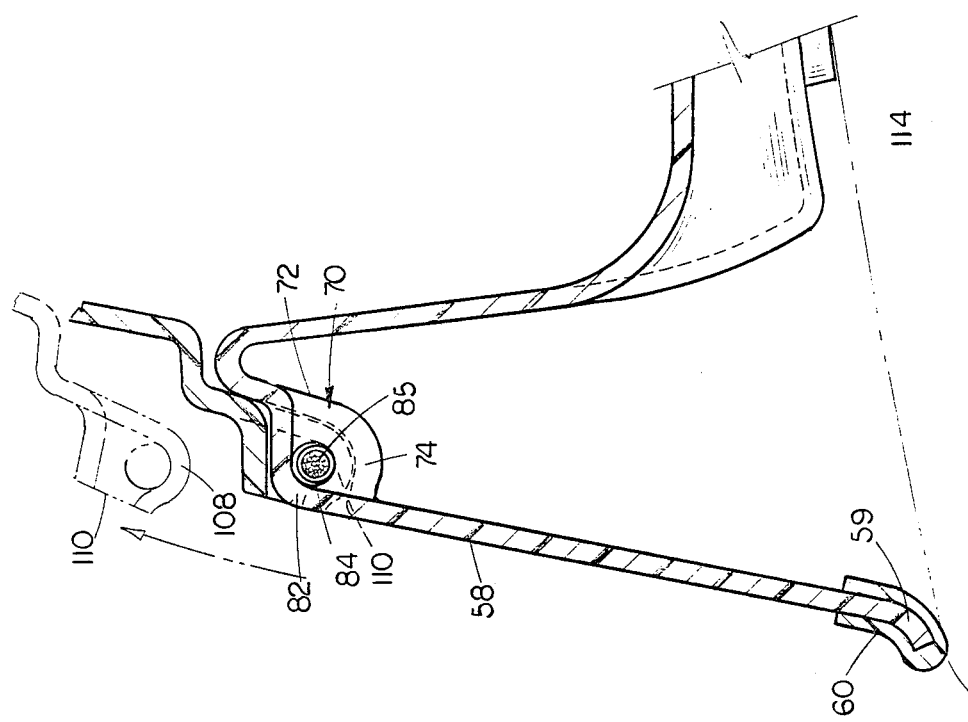
FIG. 7 is an enlarged sectional view seen on line 7—7 of FIG. 5.
Figure 9:
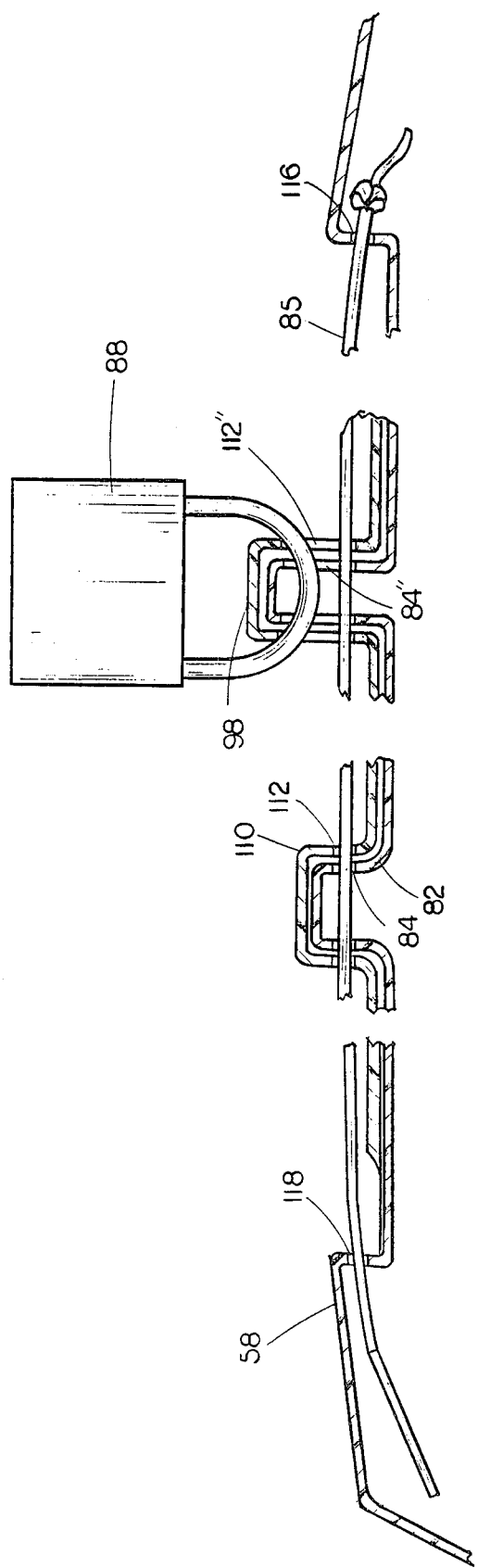
FIG. 9 is an enlarged sectional view seen on line 9—9 of FIG. 4.

As previously described, the inverted channel members 110 receive the protrusions 82 when the upper portion 16 is positioned on the lower portion 14. The forward end of the flexible lacing cable 85 is permanently secured to lower portion 14 between wall 44 and the skirt portion 58 and extends outwardly through opening 116. The cable 85 is extended through the registering openings 84 in the protrusions 82 and the openings 112. The rearward end of the cable 85 is extended through opening 118 formed in skirt portion 58 so that the end of the cable is not exposed. The channel shaped configuration of the wall lower end 108 aids in threading the lacing cable 85 through the various protrusions and channel members. Similarly, lacing cable 85 would be installed at the other side of the carrier. A pair of lanyards 120 and 122 are secured to the upper and lower portions as illustrated in FIG. 6 to limit the pivotal movement or opening of the upper portion 16.

When it is desired to open the carrier, one of the lacing cables 85 is removed and the upper portion 16 is pivotally moved to the open position about the other flexible lacing cable which not only acts as a closure member but also acts as a flexible hinge. Inasmuch as the sides of the unit are curved, it is necessary to provide a flexible hinge to reduce any binding between the upper and lower ends of the lower and upper portions of the carrier. After the lacing cable has been removed, the upper portion 16 is pivotally moved about the other flexible cable as described. The lanyard 120 or 122 will limit the pivotal movement of the upper portion 16 and will maintain the upper portion 16 in its open position.

Thus it can be seen that access may be gained to the interior of the carrier from either side thereof by simply removing one of the flexible lacing cables. The skirt of the lower portion 14 closely conforms to the roof of the vehicle and prevents the flow of air therebetween to reduce wind resistance. The configuration of the inner walls and the skirt portions of the lower portion 14 are also important in that a very strong and durable unit is provided. The design of the lower unit also enables the carrier to closely conform to the upper surface of the roof of the vehicle.

It is important to note that the use of three tie-down straps is also quite important in that the unit will still be maintained on the vehicle should one of the straps fail. In conventional carriers, only a pair of straps are utilized with disastrous results being experienced should one of the straps fail.

Another particularly important feature of the invention is the flexible lacing cable which also acts as a hinge. An important feature of the invention is that the cable is flexible and will not constitute dangerous road debris should the same somehow become disengaged from the carrier.

Thus it can be seen that the invention accomplishes at least all of its stated objectives.

I claim:

1. A storage container for travel comprising,
   a lower portion including a bottom, front and back walls, and opposite side walls, each of said walls having an upper end,
   an upper portion removably mounted on said lower portion and including a top, front and back walls, and opposite side walls, each of said walls having a lower end,
   and an elongated flexible member detachably hingedly securing the lower end of at least one of the walls of said upper portion to the upper end of at least one of the walls of said lower portion.

2. The container of claim 1 wherein said elongated flexible member comprises a lacing cable extending through said lower end of said one wall of said upper portion and the upper end of said one wall of said lower portion.

3. The container of claim 2 wherein said lacing cable forms a hinge.

4. The container of claim 2 wherein said lacing cable has forward and rearward ends, the forward end of said lacing cable being secured to said lower portion, the rearward end of said lacing cable being removably secured to said lower portion.

5. The container of claim 1 wherein a pair of said flexible members detachably secure said upper portion to said lower portion.

6. A storage container for travel comprising,
   a lower portion including a bottom, front and back walls, and opposite side walls, each of said walls having an upper end,
   an upper portion removably mounted on said lower portion and including a top, front and back walls, and opposite side walls, each of said walls having a lower end,
   said opposite side walls of said lower portion being provided with horizontally spaced-apart protrusions formed therein, adjacent the upper ends thereof, said opposite side walls of said upper portion having a plurality of horizontally spaced-apart channel members formed therein adjacent the lower ends thereof which are adapted to embrace said protrusions, said channel members and said protrusions having registering openings formed therein, a first flexible closure and hinge member removably extending through the openings in the channel members and protrusions at one side thereof, and a second flexible closure and hinge member removably extending through the openings in the channel members and protrusions at the other side thereof.

7. The carriers of claim 6 wherein said container is a roof-top carrier for a motor vehicle.

8. The container of claim 7 wherein a channel means is provided at the lower ends of said opposite side walls to facilitate the lacing of said flexible closure and hinge member through said openings.

* * * * *